United States Patent [19]

Bowsher

[11] Patent Number: 5,086,885

[45] Date of Patent: Feb. 11, 1992

[54] VEHICLE BRAKES

[75] Inventor: Glynne T. Bowsher, Birmingham, England

[73] Assignee: Sab Wabco (Holdings) B.V., Bromborough, England

[21] Appl. No.: 650,555

[22] Filed: Feb. 4, 1991

[30] Foreign Application Priority Data

Feb. 7, 1990 [GB] United Kingdom ............... 9002686

[51] Int. Cl.$^5$ .................. F16D 55/02; F16D 56/38
[52] U.S. Cl. ................... 188/71.9; 188/196 D
[58] Field of Search ............ 188/196 D, 71.9, 170; 192/11 A

[56] References Cited

U.S. PATENT DOCUMENTS 4,981,197  1/1991  Antony et al. ............... 188/196 D Primary Examiner—Joseph F. Peters, Jr.
Assistant Examiner—Anne E. Bidwell
Attorney, Agent, or Firm—Oblon, Spivak, McClelland, Maier & Neustadt

[57] ABSTRACT

A disc brake comprising a clamp member which is slidably connected to a torque taking member, with a hydraulic actuator mechanism and an adjuster mechanism being located within the clamp member and a spring arranged to act on the clamp member and adjuster mechanism to provide a parking brake facility. The adjuster mechanism comprises an adjuster nut which is threadedly engaged on an axially movable actuator shaft which acts on a friction pad, the adjuster nut having an annular series of detent teeth formed on two axially and oppositely directed faces. The detent teeth are arranged such that when the teeth on one face of the adjuster nut are fully meshed with the teeth on a part of the adjuster mechanism on which the spring acts, the teeth on the detent collar are engaged with but offset from the teeth on the other face of the adjuster nut. The adjuster nut engages an abutment during normal hydraulic operation of the brake only after the adjuster nut has moved a predetermined axial distance, the adjuster nut being caused to rotate on the actuator shaft only when the adjuster nut has to travel a distance greater than the predetermined distance to apply the brake, the detent teeth on the faces of the adjuster nut then moving over the mated teeth on the detent collar and the part of the adjuster mechanism, the spring biased detent collar causing the adjuster nut to rotate when the brake is released, to a position where the teeth on the other face of the adjuster nut are further meshed with the teeth on the detent collar, subsequent parking brake operation causing the adjuster nut to rotate to a position where the teeth on one face of the adjuster nut are fully meshed with the teeth on one part of the adjuster mechanism.

5 Claims, 3 Drawing Sheets

VEHICLE BRAKES

DESCRIPTION

The present invention relates to a disc brake for a vehicle.

In particular the present invention relates to a disc brake of the reaction type comprising a clamp member which is slidably connected to a torque taking member, the torque taking member being, in use, fixedly mounted on the vehicle. The clamp member incorporates a hydraulic actuator and a mechanical adjuster for directly applying a friction pad to one side of a braking disc, reaction forces causing the clamp member to slide relative to the torque taking member, thus applying another friction pad to the other side of the braking disc via an outboard limb of the clamp member.

More particularly the present invention relates to a reaction type disc brake which has a service brake facility and a parking brake facility, the parking brake being applied by a spring force and, during normal service brake operation, being maintained in a released condition by hydraulic pressure which acts against the spring force. The adjuster in such a brake takes account of pad wear and can comprise an adjuster nut which is threadedly engaged with a shaft which connects with a friction pad, the adjuster nut being movable on the shaft only when pad wear is sufficient to cause the shaft to move axially further than a predetermined distance to apply the brakes, the movement of the adjuster nut on the shaft having the effect of extending the adjuster length. To prevent spurious rotation of the adjuster nut on the shaft the adjuster nut is normally provided with a series of detent teeth on one axial end thereof, the teeth being formed as on an annular peripheral region of the nut, and being engageable with complementary teeth formed on another part of the adjuster. Whilst this arrangement functions perfectly satisfactorily for pad wear adjustment a problem can arise when the parking brake spring force is applied through said another part of the adjuster, the engaged detent teeth and the threaded connection between the adjuster nut and said shaft. The problem occurs when the detent teeth do not mesh and have peak to peak contact. In such a situation the application of the parking brake spring force can cause the teeth to collapse, the adjuster thus being destroyed.

The aim of the present invention is to provide a brake of the above type with a spring applied/hydraulic release parking facility wherein the detent teeth are always fully intermeshed when the parking brake facility is applied, thus obviating the aforementioned problem.

According to the present invention there is provided a disc brake comprising a clamp member which is slidably connected to a torque taking member, a hydraulic actuator mechanism and an adjuster mechanism being located within the clamp member and a spring being arranged to act on the clamp member and adjuster mechanism to provide a parking brake facility, hydraulic pressure being used to release the parking brake facility so that normal brake application and release can occur via the hydraulic actuator mechanism, the adjuster mechanism comprising an adjuster nut which is threadedly engaged on an axially movable actuator shaft which acts on a friction pad, the adjuster nut having an annular series of detent teeth formed on two axially and oppositely directed faces, the teeth on one face being engageable with complementary detent teeth provided on a part of the adjuster mechanism on which said spring acts, and the teeth on the other oppositely directed face of the adjuster nut being engageable with complementary teeth provided on an axially movable though non-rotatable, detent collar which is spring biassed against the adjuster nut, the detent teeth being arranged such that when the teeth on said one face of the adjuster nut are fully meshed with the teeth on said part of the adjuster mechanism, the teeth on said detent collar are engaged with but offset from the teeth on the other face of the adjuster nut, the adjuster nut engaging an abutment during normal hydraulic operation of the brake only after the adjuster nut has moved a predetermined axial distance, the adjuster nut being caused to rotate on the actuator shaft only when the adjuster nut has to travel a distance greater than said predetermined distance to apply the brake, the detent teeth on the said faces of the adjuster nut then moving over the mated teeth on the detent collar and said part of the adjuster mechanism, the spring biassed detent collar causing the adjuster nut to rotate when the brake is released, to a position where the teeth on said other face of the adjuster nut are further meshed with the teeth on the detent collar, subsequent parking brake operation causing the adjuster nut to rotate to a position where the teeth in said one face of the adjuster nut are fully meshed with the teeth on said one part of the adjuster mechanism.

By virtue of the present invention the spring force of the parking brake facility is always applied through the fully engaged teeth of the adjuster nut and said part of the adjuster mechanism, thereby avoiding the possibility of damage to the detent teeth as can happen with teeth with solely peak to peak contact.

In a preferred embodiment of the present invention the teeth on the adjuster nut, detent collar and said part of the adjuster mechanism are all of like pitch. However, alternatively, the teeth on said one face of the adjuster nut and on said part of the adjuster mechanism may be of like pitch, with the other teeth being of a different pitch. In the preferred embodiment the peak or apex of any one tooth on said one face is axially aligned with the base of the trough between two adjacent teeth on said other face of the adjuster nut. In this case the teeth on the axially displaceable though non-rotatable detent collar are offset from the teeth on said part of the adjuster mechanism. Preferably there is approximately one quarter pitch position difference.

With the arrangement of teeth in the adjuster mechanism which forms part of the present invention, peak to peak contact between the teeth on said one face of the adjuster nut and on said part of the adjuster mechanism is always avoided when the normal application of the brake is released. This is due to the fact that when hydraulic pressure is released during normal application of the brake and the teeth on said one face of the adjuster nut and on said part of the adjuster mechanism try to re-engage, the spring biassed detent collar will always rotate the adjuster nut until the teeth on the detent collar are fully meshed with the teeth on said other face of the adjuster nut. Due to the previously mentioned offset of the teeth, the teeth on said one face of the adjuster nut must always then be partially meshed with the teeth on said one part of the adjuster mechanism. Thus peak to peak contact is always avoided so that subsequent application of the parking brake cannot cause damage to the adjuster mechanism. When the parking brake facility is applied the load applied through the adjuster mechanism causes the adjuster nut to rotate against the spring bias of the detent collar, the teeth on said one face of the adjuster nut becoming fully meshed with the teeth on the said part of the adjuster mechanism whilst the detent collar and adjuster nut become partially disengaged.

The present invention will now be further described, by way of example, with reference to the accompanying drawings, in which.

Figure 1:
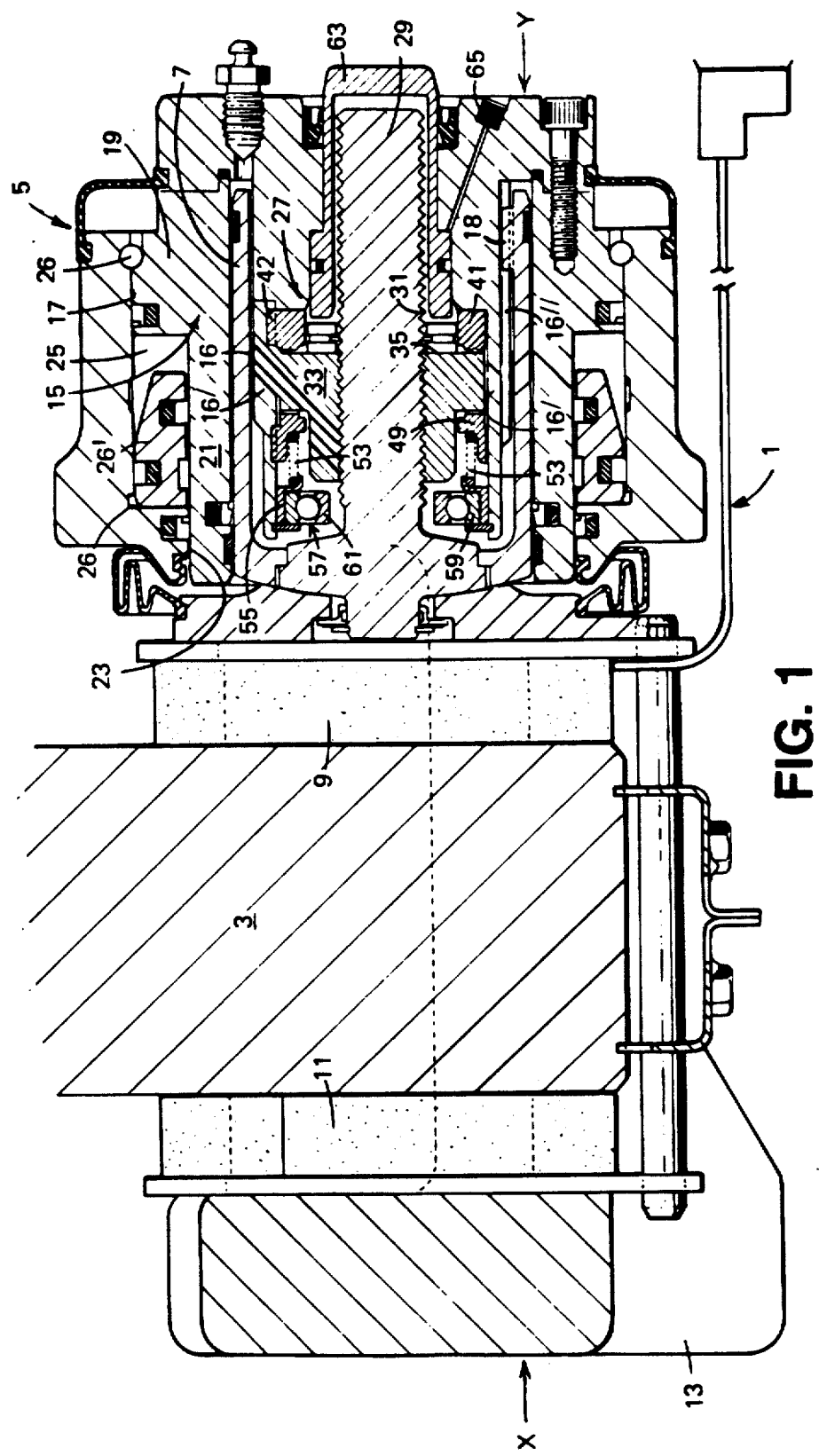
FIG. 1 illustrates a preferred embodiment of the present invention.
Figure 2:
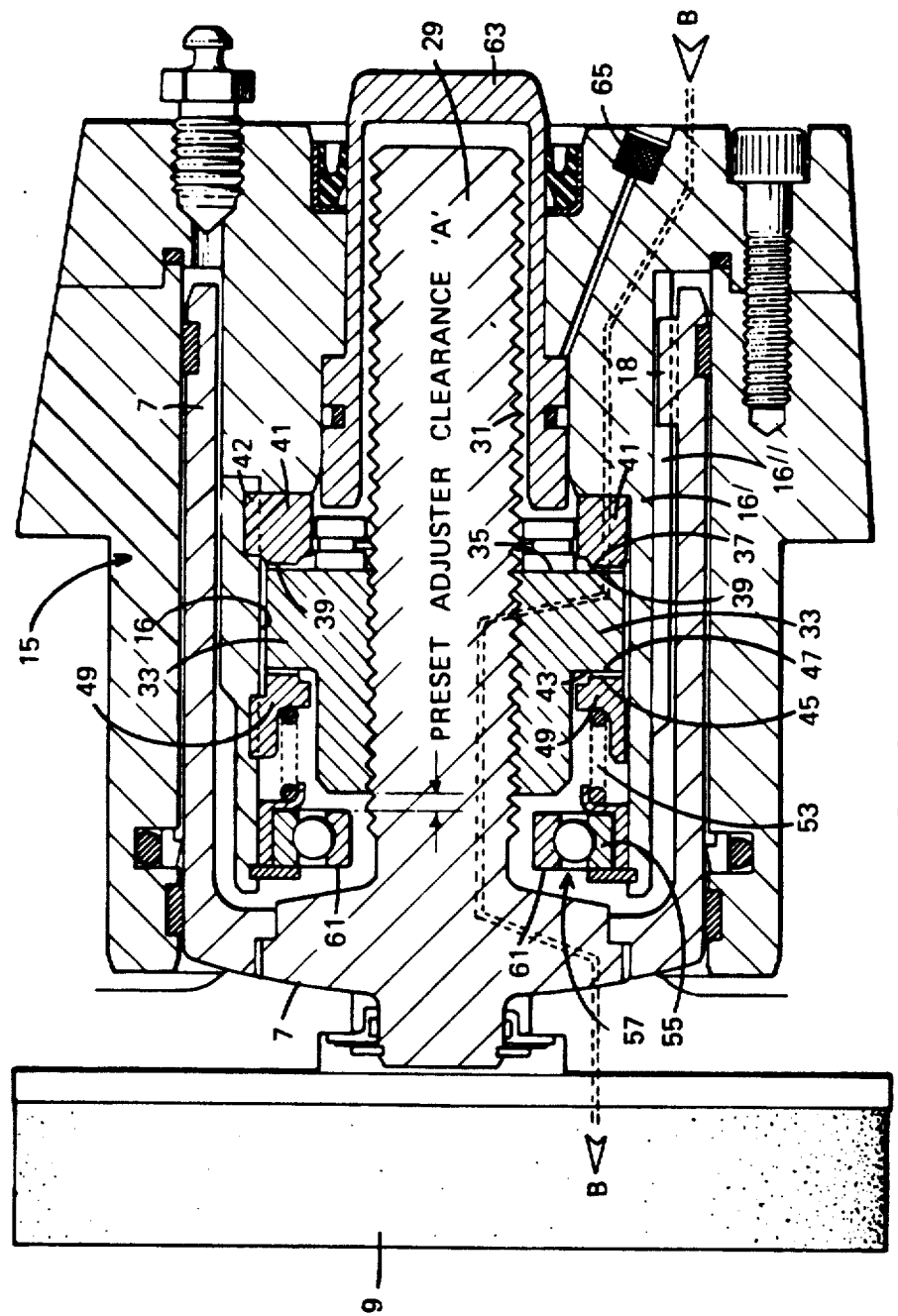
FIG. 2 is an enlarged detail of part of the brake of FIG. 1.
Figure 3:
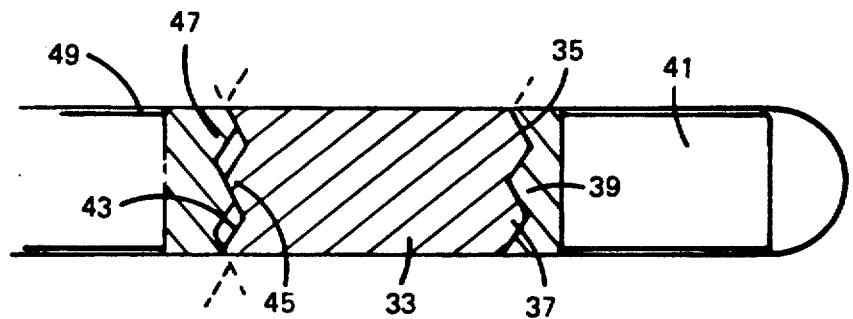
Figure 4:
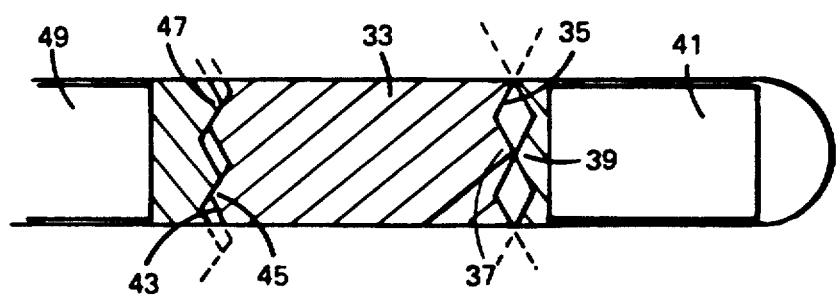

FIG. 3 schematically illustrates the adjuster component of the brake of FIGS. 1 and 2 when under parking brake load; and FIG. 4 schematically illustrates the adjuster components of the brake of FIGS. 1 and 2 in a possible position which can be attained on the release of a normal brake application.

The preferred embodiment of the present invention illustrated in the accompanying drawings is a reaction type disc brake which has a clamp member 1 which straddles the periphery of a braking disc 3. The clamp member 1 has a hydraulic actuator 5 located on one side of the braking disc, the hydraulic actuator 5 comprising a service piston 7 which can be moved under hydraulic pressure to act directly on a friction pad 9, to thus press the friction pad 9 against one side of the braking disc 3 causing the clamp member 1 to move axially of the disc, thereby pressing a further friction pad 11 which is engaged by an outboard limb 13 of the clamp member 1, against the other side of the braking disc, resulting in normal service brake application.

The service piston 7 is hollow and axially slidably located within a park piston 15, with the park piston 15 being axially slidably located within a bore 17 of the clamp member 1. The park piston 15 has an enlarged diameter region 19 which is axially slidably sealed with an enlarged diameter part of the wall of the bore 17, a reduced diameter region 21 of the park piston 15 being axially slidably sealed with a reduced diameter part 23 of the wall of bore 17. Thus a park piston hydraulic chamber 25 is defined and the axial position of the park piston 15 in the bore 17 can be maintained by maintaining the hydraulic pressure in chamber 25. The park piston 15 is restrained from rotation in the bore 17; by frictional forces produced by the seals between the park piston 15 and the bore 17 and by the engagement of a spring (not shown) which, as later described, applies the parking brake when the pressure in chamber 25 is released.

The park piston 15 is connected to the service piston 7 by an adjuster mechanism 27 which allows the service piston 7 to move relative to the park piston 15 when hydraulic pressure is applied or released for normal service brake operation, but which provides a positive connection between the pistons 7, 15 when the hydraulic pressure in chamber 25 is released to allow a spring (not shown) to apply a force to the outboard limb of the clamp member as at arrow 'X' and to the park piston 15 as at arrow 'Y' to thus apply a parking brake. By increasing the hydraulic pressure in chamber 25 the park piston 15 is moved against the spring to engage a stop 26, and to release the parking brake. Should a fault occur whereby pressure cannot be produced or maintained in chamber 25 so that the parking brake cannot be released, hydraulic pressure can be applied at 26 to move annular release piston 26' into engagement with park piston 15 and thereby release the brake.

The adjuster mechanism 27 comprises an elongate actuator shaft 29 which is integral with the hollow service piston 7 and extends coaxially therewithin. The actuator shaft 29 has a thread 31 on which a complementarily threaded adjuster nut 33 is carried, the adjuster nut 33 having one axial end face 35 (see FIG. 2) on which detent teeth 37 are provided, these detent teeth 37 being engageable with complementary teeth 39 formed on a fixed detent ring 41 which is fixedly keyed as at 42 on splines 16 provided on a part 16' of the park piston 15, which extends within the service piston 7 and on which said spring acts. Said part 16' of the park piston 15 is also provided with axially extending splines 16" on which the service piston 7 is keyed as at 18, to thus prevent relative rotation whilst allowing relative axial movement. Another oppositely directed face 43 (see FIG. 2) of the adjuster nut 33 carries detent teeth 45 which are engageable with complementary teeth 47 formed on an annular detent collar 49, the detent collar 49 being axially movable on the splines 16 provided on the park piston 15, said splines 16 preventing rotation of the detent collar 49 relative to the park piston 15. The detent collar 49 is biassed into engagement with the adjuster nut 33 by a spring 53 which engages against a stop 55 fixedly provided on the park piston 15. A bearing 57 is also fixedly provided on the park piston 15, the bearing having an outer race 59 which is secured to the park piston 15 and a freely rotatable inner race 61 which is normally spaced from the adjuster nut 33 by a predetermined distance 'A' in a service brake released condition (see FIG. 2), but which can be engaged by the adjuster nut 33 when movement of the service piston 7 reduces the pad/disc clearance to zero.

Parking brake force as provided by the said spring (not shown) is held off by pressurising the annular park piston chamber 25. Release of this pressure clamps the friction pads 9, 11 to the braking disc 3, the adjuster mechanism 27 acting as a strut to transfer the spring load from the park piston 15 to the service piston 7 and then to the inboard friction pad 9. By reaction the spring load acts on the outboard friction pad 11 via the outboard limb 13 of the clamp member 1. When operating as a parking brake the parking spring load is transmitted through the fully engaged detent teeth on the adjuster nut 33 and fixed detent 41. This load generates a torque at the thread interface 31 between the adjuster nut 33 and actuator shaft 29, the torque trying to rotate the adjuster nut 33 by sliding its detent teeth 37 over those of the fixed detent 41. However the axial component of the generated torque, at the detent effective radius, is only one eighth of the axial force clamping the components together. Thus adjuster nut rotation is prevented and the fully meshed detent teeth 37, 39 obviate any possibility of the collapse of the adjuster mechanism 27 under parking brake spring force. By reaction, the same thread torque will try to rotate the actuator shaft 29 and service brake piston 7. However the service brake piston 7 is keyed as at 18 to the park piston 15 via three equally spaced apart splines 16". Service piston rotation and adjuster mechanism collapse are thus again effectively prevented.

With park piston chamber 25 pressurised, the parking brake is released and in this condition the detent spring 53 ensures that the adjuster nut 33 still fully engages the teeth 39 of the fixed detent 41 by loading the adjuster nut 33 through the teeth 47 of the detent collar 49. This provides the present adjuster clearance 'A' between the inner race 61 of the bearing 57 and the end of the adjuster nut 33. This clearance equates to the combined pad clearances and includes an allowance for the inward calliper body deflection which occurs when the parking brake spring is expanded to the brakes released position.

With the parking brake released, service brake application by the increase of hydraulic pressure behind the service piston 7, moves the service piston 7 and actuator shaft 29 out from within the park piston 15, disengaging the adjuster nut 33 from the fixed detent 41 and reducing the clearance 'A' between the adjuster nut 33 and the inner race 61 of bearing 57. In this position the detent spring load, through engagement of the detent collar 49 and adjuster nut 33, will generate a thread torque which will try to rotate the adjuster nut 33 on the actuator shaft 29. However the resistive detent torque produced by the meshed teeth of the collar 49 and nut 33 is initially too great and nut rotation is prevented. As adjuster nut 33 touches the inner race 61 of bearing 57, brake pads 9, 11 touch brake disc 3—both clearance 'A' and the combined pad clearances having been removed together.

As the friction pads 9, 11 wear the service piston 7 and clamp member 1 move further apart to compensate, the actuator shaft 29 moving with the service piston 7. This movement of the service piston 7 presses the adjuster nut 33 harder against the inner race 61 of the bearing 57, producing a much greater thread torque, this thread torque being sufficient to overcome the detent collar torque so that the adjuster nut 33 rotates on the actuator shaft 29 against the detent collar torque, thereby accommodating the pad wear. The free inner race 61 of the bearing 57 aids this rotation.

Rotation of the adjuster nut 33 against the detent collar 49 will slide the flanks of the teeth 45 over the flanks of the teeth 47 and further compress the detent spring 53, and when the service brake is released the detent spring 53 will cause the adjuster nut 33 to rotate back until the teeth 47 on the detent collar 49 are fully meshed with the teeth 45 on the adjuster nut 33, thus effectively increasing pad clearance in the service brake released condition. This will continue for subsequent service brake applications until pad wear is sufficient for the adjuster nut 33 to rotate to a position wherein the teeth 45 on the adjuster nut 33 have each moved beyond the peaks of teeth 47 on the detent collar 49. On brake release the adjuster nut 33 rotates on to fully engage the teeth 45 into the next detent position of teeth 47 of detent collar 49. Reaction with the teeth of fixed detent 41 aids this rotation and pad clearance returns to the original value set by pre-set clearance 'A'.

As is evident from FIGS. 3 and 4 of the accompanying drawings, the teeth on the detent collar 49, adjuster nut 33 and fixed detent 41 are all of the same pitch. However, the sole requirement is that the teeth on one end of the adjuster nut 33 are the same as on the detent collar 49, and at the other end of the adjuster nut 33 are the same as on the fixed detent 41. As is also evident from these drawings of the preferred embodiment, the peak of any tooth at one end of the adjuster nut 33 is axially aligned with the base of the trough between two adjacent teeth at the other end of the adjuster nut 33. Further, and most importantly, the detent collar 49 is fixed against rotation with its teeth 47 offset from the teeth 39 on the fixed detent 41. The offset is preferably one quarter of the teeth pitch. This offset is achieved provided that the number of slots/splines keying the detent collar 49 to the park piston 15 is not fully divisible into the number of detent teeth. The preferred configuration of FIG. 3 is achieved by selecting a suitable assembly position for the detent collar 49 within the splines 16 of said part 16' of the park piston 15.

Under normal service brake operation the detent teeth 45 of adjuster nut 33 will always fully engage the teeth 47 of detent collar 49, ensuring that a 'peak to peak' condition (FIG. 4) between teeth 37 of adjuster nut 33 and teeth 39 of fixed detent 41 will not occur. Should the peak-to-peak condition shown in FIG. 4 try to occur on retraction of the service piston and after some adjustment through pad wear, the spring 53 acting through detent collar 49, adjuster nut 33, and fixed detent 41, will produce a tangential force between the flanks of teeth 47 and 45, which will produce a torque large enough to turn adjuster nut 33 away from the 'peak to peak' engagement shown.

Application of the spring park brake by the release of pressure in chamber 25 will axially load teeth 37 against teeth 39 once the brake pads have reached the brake disc. This load will rotate adjuster nut 33 to fully engage the teeth 37 of adjuster nut 33 with teeth 39 of fixed detent 41.

With the above arrangement of teeth, the adjuster nut teeth 37 always fully engage the fixed detent teeth 39 when the service brake is released and the park brake is applied. Thus the spring park load is always transmitted through fully engaged teeth along the path B (see FIG. 2), avoiding the possibility of adjuster collapse due to the spring park load. Starting from the relative teeth positions of FIG. 3 which correspond to the teeth positions during park brake application, when the park brake is released the detent spring 53 will try to rotate the adjuster nut 33 so that the teeth 47 on the detent collar 49 fully engage the teeth 45 on the adjuster nut 33. However, the thread 31 between the adjuster nut 33 and the actuator shaft 29, together with the interengaged teeth of the adjuster nut 33 and fixed detent 41 will resist this movement. If however, adjustment occurs as discussed hereabove, so that the adjuster nut 33 is rotated on the actuator shaft 29 as the service brake is applied, then on release of the service brake the detent collar 49 under the action of the compressed detent spring 53, will rotate the adjuster nut 33 to a position where the detent collar teeth 47 are fully engaged with the adjuster nut teeth 45. Subsequently the other teeth 37 of the adjuster nut 33 will engage the teeth 39 of the fixed detent 41, though due to the offset between the detent collar teeth 47 and the fixed detent teeth 39, the adjuster nut 33 will always partially engage with the fixed detent teeth 39, avoiding the possibility of peak to peak contact between the teeth which could lead to adjuster damage on subsequent application of the spring park load. With this partial interengagement of the teeth of the adjuster nut 33 and fixed detent 41, subsequent park brake application causes the adjuster nut 33 to rotate to fully engage the teeth 37 of the adjuster nut 33 with the teeth 39 of the fixed detent 41 for the positive transfer of park brake load. Even if the detent collar teeth 47 do not for some reason initially fully engage with the adjuster nut teeth 45 on service brake release, any possible peak to peak contact (see FIG. 4) between the adjuster nut teeth 37 and fixed detent teeth 39 is countered by the detent spring load eventually rotating the adjuster nut 33 to achieve complete detent collar- /adjuster nut engagement wherein the adjuster nut 33 and fixed detent 41 are partially engaged.

To collapse the adjuster mechanism for the installation of new friction pads 9, 11, a de-adjust plunger 63 is provided. This can be axially moved to lift the adjuster nut 33 off the fixed detent 41, disengaging the teeth 37, 39. An axial load applied to the service piston 7 then produces a torque at the actuator shaft/adjuster nut thread interface 31 which is large enough to overcome the resistive torque of the detent collar 49 and spring 53. The service piston 7 and actuator shaft 29 thus are moved back into the park piston 15, rotating the adjuster nut 33 against the detent collar 49 whilst the adjuster nut 33 is held out of engagement with the fixed detent 41 by the de-adjust plunger 63. When the service piston/actuator shaft are fully retracted, the de-adjust plunger 63 is released to allow the detent spring 53 to re-engage the teeth of the adjuster nut 33 and fixed detent 41. A filtered vent 65 allows air to enter the chamber formed when the de-adjust plunger 63 is moved into the de-adjust position, and to be expelled when the plunger 63 is released.

The present invention thus provides a reaction type disc brake incorporating an adjuster mechanism 27 which is protected against damage when parking brake force is applied via the adjuster mechanism 27.

I claim:

1. A disc brake comprising a clamp member which is slidably connected to a torque taking member, a hydraulic actuator mechanism and an adjuster mechanism being located within the clamp member and a spring being arranged to act on the clamp member and adjuster mechanism to provide a parking brake facility, hydraulic pressure being used to release the parking brake facility so that normal brake application and release can occur via the hydraulic actuator mechanism, the adjuster mechanism comprising an adjuster nut which is threadedly engaged on an axially movable actuator shaft which acts on a friction pad, the adjuster nut having an annular series of detent teeth formed on two axially and oppositely directed faces, the teeth on one face being engageable with complementary detent teeth provided on a part of the adjuster mechanism on which said spring acts, and the teeth on the other oppositely directed face of the adjuster nut being engageable with complementary teeth provided on an axially movable though non-rotatable, detect collar which is spring biassed against the adjuster nut, the detent teeth being arranged such that when the teeth on said one face of the adjuster nut are fully meshed with the teeth on said part of the adjuster mechanism, the teeth on said detent collar are engaged with but offset from the teeth on the other face of the adjuster nut, the adjuster nut engaging an abutment during normal hydraulic operation of the brake only after the adjuster nut has moved a predetermined axial distance, the adjuster nut being caused to rotate on the actuator shaft only when the adjuster nut has to travel a distance greater than said predetermined distance to apply the brake, the detent teeth on the said faces of the adjuster nut then moving over the mated teeth on the detent collar and said part of the adjuster mechanism, the spring biassed detent collar causing the adjuster nut to rotate when the brake is released, to a position where the teeth on said other face of the adjuster nut are further meshed with the teeth on the detent collar, subsequent parking brake operation causing the adjuster nut to rotate to a position where the teeth on said one face of the adjuster nut are fully meshed with the teeth on said one part of the adjuster mechanism.

2. A disc brake according to claim 1, wherein the teeth on the adjuster nut, detent collar and said part of the adjuster mechanism, are all of like pitch.

3. A disc brake according to claim 2, wherein the peak of any one tooth on said one face of the adjuster nut is axially aligned with the base of the trough between two adjacent teeth on said other face of the adjuster nut.

4. A disc brake according to claim 3, wherein the teeth on the axially displaceable though non-rotatable detent collar are offset from the teeth on said part of the adjuster mechanism.

5. A disc brake according to claim 4, wherein the teeth on the detent collar are offset by approximately one quarter pitch from the teeth on said part of the adjuster mechanism.

* * * * *

UNITED STATES PATENT AND TRADEMARK OFFICE
CERTIFICATE OF CORRECTION

PATENT NO. : 5,086,885

DATED : February 11, 1992

INVENTOR(S) : Glynne T. Bowsher

It is certified that error appears in the above-identified patent and that said Letters Patent is hereby corrected as shown below:

On the title page: Item

[73]   Assignee:   Sab Wabco (Holdings) B.V.,
                    Heerhugowaard, Holland Signed and Sealed this Fourteenth Day of March, 1995

Attest:

BRUCE LEHMAN

*Attesting Officer*   *Commissioner of Patents and Trademarks*